United States Patent [19]

Numata et al.

[11] Patent Number: 4,983,671

[45] Date of Patent: Jan. 8, 1991

[54] TWO COMPONENT POLYURETHANE COATING

[75] Inventors: Syuhei Numata, Hirakata; Masanori Ohiwa, Toyonaka; Toshihiro Maekawa, Suita; Akio Kashihara, Hirakata; Tadafumi Miyazono, Takatsuki, all of Japan

[73] Assignee: Nippon Paint Co., Ltd., Osaka, Japan

[21] Appl. No.: 61,207

[22] Filed: Jun. 12, 1987

[30] Foreign Application Priority Data

Jun. 12, 1986 [JP] Japan ............................... 61-136967
May 25, 1987 [JP] Japan ............................... 62-127444

[51] Int. Cl.$^5$ ..................... C08L 51/00; C08L 75/06
[52] U.S. Cl. ........................................ 525/63; 525/66; 525/69; 525/122; 525/123; 525/125; 525/131; 525/440; 525/902
[58] Field of Search ................. 525/66, 902, 122, 123, 525/125, 131, 68, 69, 440

[56] References Cited

U.S. PATENT DOCUMENTS 4,115,472  9/1978  Porter, Jr. et al. .................. 525/66
4,342,847  8/1982  Goyert et al. ........................ 525/66

*Primary Examiner*—Ana L. Carrillo
*Attorney, Agent, or Firm*—Wenderoth, Lind & Ponack

[57] ABSTRACT

A two component polyurethane coating consisting of a principal component (A) comprising a hydroxyl group containing film-forming resin, crosslinked polymer particles and a solvent for said film-forming resin and a hardener component (B) comprising a polyisocyanate compound, which is characterized by using as the crosslinked polymer particles composite resin particles each comprising a particulate crosslinked polymer core and a number of substantially linear polymer chains coupled with said core by either chemical bonding, semi-interpenetration or both, and containing metal element in either portion of said core, said polymer chains or both of them; the solid weight ratio of said hydroxyl group containing film-forming resin to said composite resin particles being 99/1 to 40/60 and the equivalent ratio of isocyanate groups in the hardener component (B) to hydroxyl groups in the principal component (A) (if the linear polymer chains contain hydroxyl groups, the sum of said hydroxyl groups and those of the film-forming resin) being 0.5 to 2.0.

The coating composition is excellent in dispersion stability, application characteristics and drying fastness and capable of resulting in an excellent coating.

3 Claims, No Drawings

TWO COMPONENT POLYURETHANE COATING

FIELD OF THE INVENTION

The present invention relates to a two component polyurethane coating and more specifically, to a two component polyurethane coating containing crosslinked polymer particles which is excellent in dispersion stability, application characteristics and drying fastness, capable of producing a coating with excellent gloss, transparency and coating appearance, as well as excellent polishing resistance, and hence is quite useful as an autorepair paint and the like.

BACKGROUND OF THE INVENTION

A two component polyurethane coating consisting of a hardener component of a polyisocyanate compound and a resinous component of a hydroxyl group containing film-forming resin is being watched with keen interest in various technical fields including the auto-repair, wood processing and other industries, because such coatings do not require a high temperature baking operation.

In such a coating, it is highly desired to be of a fast-drying nature from the viewpoint of reduction in processing steps and energy consumption.

Various attempts have been, therefore, made to give the desired fast-drying characteristics to two component polyurethane coatings, but no satisfactory solutions have been yet found. For example, when one attempts to utilize, as a resinous component, an acrylic resin with a higher molecular weight or a higher glass transition temperature (Tg), there occurs such problems that, since a non-volatile matter in the spray is in a lower order, the coating must be applied many times and, moreover, the coating thus obtained is, in general, poor in appearance.

In attempts to compound each resin with a cellulosic resin, such as nitrocellulose, cellulose acetate butyrate (CAB) and the like, there are similar problems as above-mentioned. When an increased amount of catalyst is used, the pot-life of the resulting composition is proportionally decreased and the coating thus obtained is poor in appearance. Further, when an attempt is made to use, as a hardener an aromatic polyisocyanate compound, there is the problem of poor weather resistance. Thus, none of the aforesaid attempts have succeeded in producing fruitful results.

Recently, the so-called gellated resin particles having three-dimensionally crosslinked structures and being substantially insoluble in an organic solvent have been proposed. If the gellated resin particles are in the two component polyurethane coating system, it would be probable that the desired fast-drying might be obtained therewith from the combination of a pigment filler effect as plastic pigment and hard resin effect of the crosslinked polymer particles.

However, the heretofore proposed crosslinked polymer particles were merely developed for the purpose of high solidification or rheology control of a solvent type coating composition, thereby overcoming the drawbacks of sagging and cratering tendencies and of deficient weather resistance or the like. Even the slightest consideration had been made as to the possible use of these crosslinked polymer particles in the room temperature curing type polyurethane coatings. Therefore, even when examined with a two component polyurethane coating to be cured at room temperature, it was not possible to produce a product which satisfies with every aspect of application characteristics, drying properties and dispersion stability. The coating thus obtained was in fact poor in gloss, transparency and finishing appearance. Under the circumstances, it is a principal object of the invention to provide a two component polyurethane coating containing crosslinked polymer particles, which is excellent in dispersion stability, application characteristics and drying fastness, capable of resulting in a coating with excellent gloss, transparency and appearance, as well as excellent polishing resistance, and which is particularly useful as an auto-repair paint and the like.

SUMMARY OF THE INVENTION

According to the invention, the aforesaid and other objects of the invention is attained with a two component polyurethane coating consisting of a principal component (A) comprising a hydroxyl group containing a film-forming resin, crosslinked polymer particles and a solvent for said film-forming resin, and a hardener component (B) comprising a polyisocyanate compound, which is characterized by using, as the crosslinked polymer particles, composite resin particles each comprising a particulate crosslinked polymer core and a number of substantially linear polymer chains coupled with said core by chemical bonding, and/or semi-interpenetration, the solid weight ratio of said hydroxyl groups containing film-forming resin to said composite resin particles being 99/1 to 40/60 and the equivalent ratio of the isocyanate groups in the hardener component (B) to hydroxyl groups of the main component (A) (if the linear polymer chains contain hydroxyl groups, the sum of said hydroxyl groups and those of the hydroxyl group containing film-forming resin) being 0.5 to 2.0.

The crosslinked polymer particles used in the invention are composite resin particles each comprising a particulate crosslinked polymer core and a number of substantially linear polymer chains coupled with said core by either chemical bonding or semi-interpenetration or both, and containing a metal element in either portion of said core, said polymer chains or both of them.

In the present specification and claims, the term "metal element" or "metal" shall mean the element capable of exerting a catalytic action on a urethanation reaction. Examples of such metals are Zn, Sn, Al, Fe, Zr, Ti, Ge, Pb, Cr, Mg, Ca, Sr, Li, Na and K, the most preferable members being Sn, Zn, Al, Fe and Zr. The term "polymer" shall include both condensation type polymers, such as polyester resins, epoxy resins, polyether resins, amino resins and the like and polymerization type polymers, such as acrylic resins, vinyl resins and the like. Since the linear polymer chain may include certain degree of branching or crosslinking, depending on the intended application, the term "substantially linear" shall mean a polymer chain which is essentially a linear polymer, which may possess a degree of branching or crosslinking therein. As abovementioned, the composite resin particles used in the invention have two distinct characteristic features, one being the specific structure comprising a particulate crosslinked polymer core and a number of substantially linear polymer chains coupled with said core by either chemical bonding, semi-interpenetration or both, and the other being the presence of a metal element in either portion of said core, said polymer chains or both of them. The composite resin particles with such structural features may be advantageously prepared by either method of the following methods.

That is, the composite resin particles [A] each comprising a particulate crosslinked polymer core and a number of substantially linear polymer chains chemically bonded to said core may be obtained by (1) a method wherein addition polymerizable unsaturation bonds are introduced to the particulate crosslinked polymer, during or after formation thereof, and addition polymerizable ethylenic compounds are reacted therewith, or (2) a method wherein microparticles of a crosslinked polymer bearing appropriate functional groups are reacted with a reactive derivative of a substantially linear polymer. The composite resin particles [B] each comprise a particulate crosslinked polymer core and a number of substantially linear polymer chains coupled with said core through semi-interpenetration may be obtained by the method wherein ethylenically unsaturated compounds are subjected to a solution polymerization in an organic solvent and in the presence of crosslinked polymer particles.

The composite resin particles [C], each comprising a particulate crosslinked polymer core and a number of substantially linear polymer chains coupled with said core partly through chemical bonding and partly through semi-interpenetration may be advantageously prepared by the combination of the abovesaid methods, i.e. the method wherein ethylenically unsaturated compounds are subjected to a solution polymerization in an organic solvent and in the presence of the composite resin particles each comprising a particulate crosslinked polymer core and a number of substantially linear polymer chains chemically bonded to said core.

Introduction of a metal element into the polymer chains may be effected by using an appropriate monomer containing metal element for the preparation of said polymer chains or by reacting the composite resin particles already containing polymer chains with an appropriate metallic compound, and introduction of the metal element into the crosslinked polymer core may be effected by using an appropriate monomer containing metal element for the preparation of said core or by reacting the crosslinked polymer core with an appropriate metallic compound, as desired.

The actual process to be used for the preparation of the present composite resin particles may be determined by the structural feature desired, the combination of polymers used and the location of the metal element in the composite resin particles.

As already stated, the core portion of the present composite resin particles may be composed of any polymers of a polycondensation type, such as a polyester resin, an epoxy resin, an amino resin, a polyether resin and the like or of addition polymerization type such as an acrylic resin and a vinyl resin, providing they are three-dimensionally crosslinked. The mean diameter of said core portion is preferably in a range of 0.01 to 10 μ. The substantially linear polymer chains may be also composed of various members selected from acrylic resins, polyester resins, polyether resins and the like, and however, from the standpoint of preparation easiness and application range, the particularly preferable members are acrylic resins and vinyl resins. Thus, in the present invention, the preferable composite resin particles each comprises a crosslinked resin core, most preferably a crosslinked acrylic resin core and a number of substantially linear acrylic or vinyl polymer chains coupled with said core by either chemical bonding, semi-interpenetration or both and containing a metal element in either portion of said core, said polymer chains or both of them.

Therefore, the preparation of such particles shall be more specifically stated hereinunder.

PREPARATION OF THE PRESENT COMPOSITE ACRYLIC RESIN PARTICLES (1) The particles wherein the polymer core and polymer chains are chemically bonded and the metal element is included in the polymer chains.

These particles may be prepared by either one of the following methods. That is, in the first method, a monomer mixture of a polyfunctional monomer containing two or more polymerizable ethylenic goups each having different coreactivities, and polymerizable monomers including a crosslinking monomer which are reactive with one ethylenic group of said polyfunctional monomer is subjected to an emulsion polymerization to obtain an emulsion of particulate materials of a crosslinked polymer still having the other ethylenic group of said polyfunctional monomer in a free state in the polymer, and after adding a polymerizable monomer reactive with the other ethylenic groups still remained in the aforesaid particulate materials, a metal-containing monomer and other optional polymerizable monomers, a graft polymerization is effected to form substantially linear, metal-containing acrylic polymer chains.

In another method, the abovesaid second step is effected without using the metal-containing monomer and the thus obtained composite acrylic resin particles are treated with a metallic compound to introduce the metal element into the substantially linear acrylic polymer chains through esterification or a ester-exchange reaction.

The term "polymerizable ethylenic groups each having different co-reactivity" as used herein shall mean the combination of ethylenic groups, one being of a selective nature towards the type of copolymerizable monomers as 1,2-di-, 1,1,2-tri- or 1,1,2,2-tetra-substituted ethylene and the other having no such selectivity as mono- or 1,1-di-substituted ethylene groups, or the combination of ethylenic groups, one being able to produce a homopolymer and the other not, or the combination of ethylenic groups each having different reactivities.

In this invention, any polyfunctional monomer having in its molecule two or more of such ethylenic groups may be advantageously used for the preparation of the present composite resin particles. Examples of such monomers are allyl (meth) acrylate, addition products or allyl glycidyl ethers and acrylic or methacrylic acid, addition products of a monoallyl amine or a diallyl amine and a glycidyl (meth) acrylate or a (meth) acryloyl bearing isocyanate, addition products of allyl alcohol and a (meth) acryloyl bearing isocyanate, addition products of maleic acid or fumaric acid and glycidyl (meth) acrylate, addition products of maleic or fumaric monoesters and glycidyl (meth) acrylate, and addition products of unsaturated fatty acids and glycidyl (meth) acrylates.

Among the various ethylenic groups, the unsaturation bonds included in maleic or fumaric acid, or derivatives thereof, i.e. 1,1-di-, 1,1,2-tri, or 1,1,2,2-tetra-substituted ethylenic groups, are selectively reactive with polymerizable aromatic compounds, whereas the unsaturation bonds included in acryloyl or methacryloyl groups, i.e. mono- or 1,1-di-substituted ethylenic groups are non-selective in the type of employable comonomers.

Therefore, in a most preferable embodiment, the former is used for the preparation of linear polymer chains and the latter is for the preparation of a crosslinked core polymer. Examples of such particularly useful monomers having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, are addition products of maleic acid and glycidyl acrylate, addition products of maleic acid and glycidyl methacrylate, addition products of fumaric acid and glycidyl acrylate, addition products of fumaric acid and glycidyl methacrylate, addition products of maleic acid monoester and glycidyl acrylate, maleic acid monoester and glycidyl methacrylate, addition products of fumaric acid monoester and glycidyl acrylate, addition products of fumaric acid monoester and glycidyl methacrylate, addition products of substituted maleic acid and glycidyl (meth) acrylate, addition products of substituted maleic acid monoester and glycidyl (meth) acrylate, addition products of substituted fumaric acid and glycidyl (meth) acrylate, and addition products of substituted fumaric acid monoester and glycidyl (meth) acrylate.

The abovesaid polyfunctional monomer is combined with other α, β-ethylenic monomers including a crosslinking monomer and the mixture is subjected to an emulsion polymerization to prepare the particulate crosslinked acrylic polymer. As a crosslinking monomer, any of the known compounds having in its molecule two or more radically polymerizable ethylenic unsaturation bonds may be satisfactorily used, as, for example, a polymerizable unsaturated monocarboxylic acid ester of a polyhydric alcohol and a polymerizable unsaturated alcohol ester of a polycarboxylic acid. Alternatively, use can be made of a combination of compounds each having a mutually reactive functional group and one or more α, β-ethylenically unsaturation bonds, as, for example, (meth) acrylic acid and glycidyl (meth) acrylate; hydroxy (meth) acrylate and an isocyanate alkyl (meth) acrylate (blocked compound); and radically polymerizable silane coupling agents, such as vinyl trialkoxy silane and (meth) acryloxyalkyl trialkoxy silane and the like. Other α,β-ethylenic monomers may be any type of compounds customarily used in the preparation of acrylic resin. However, in order to leave the maleic type double bonds in a free form in the resulted polymer, a polymerizable aromatic compound capable of showing a selective reactivity towards said double bonds should be excluded therefrom. Examples of such monomers are classified in the following groups.

(1) carboxyl group containing monomers
as, for example, acrylic acid, methacrylic acid, crotonic acid, itaconic acid, maleic acid, fumaric acid and the like, (2) hydroxyl group containing monomers
as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, (3) nitrogen containing alkyl acrylates or methacrylates
as, for example, dimethyl aminoethyl acrylate, dimethyl aminoethyl methacrylate and the like, (4) polymerizable amides
as, for example, acryl amide, methacryl amide and the like, (5) polymerizable nitriles
as, for example, acrylonitrile, methacrylonitrile and the like, (6) alkyl acrylate or methacrylates
as, for example, methyl acrylate, methyl methacrylate, ethyl acrylate, n-butyl acrylate, n-butyl methacrylate, 2-ethyl hexyl acrylate and the like, (7) polymerizable glycidyl compounds
as, for example, glycidyl acrylate, glycidyl methacrylate and the like, (8) α-olefins
as, for example, ethylene, propylene and the like, (9) vinyl compounds
as, for example, vinyl acetate, vinyl propionate and the like,

(10) diene compounds
as, for example, butadiene, isoprene and the like, reaction compounds of the abovesaid monomers as, for example, reaction compounds of hydroxyl containing monomers (2) with isocyanate compounds, reaction compounds of carboxyl containing monomers (1) with glycidyl containing compounds and the like.

They may be used each singularly or in combination form. The emulsion polymerization may be carried out in a conventional way, using a polymerization initiator and an appropriate emulsifier. Particularly preferable emulsifiers are acrylic, polyester, alkyd or epoxy resins having in its molecule an amphoionic group of the formula:

wherein R represents $C_1$ to $C_6$ alkylene or phenylene and $Y^\ominus$ stands for $—COO^\ominus$ or $—SO_3^\ominus$, as disclosed in Japanese Patent Application Kokai No. 129066/83.

In this first step of polymerization, only mono- or 1,1-di-substituted ethylenic bonds may participate in the reaction, giving crosslinked acrylic polymer particles still having unreacted 1,2-di-, 1,1,2-tri- or 1,1,2,2-tetra-substituted ethylenic unsaturation bonds on the surfaces thereof. Therefore, in the next stage of reaction, a polymerizable aromatic compound is added to the abovesaid emulsion and polymerization is continued to effect a graft polymerization between the remaining ethylenic unsaturation bonds and the polymerizable aromatic compound.

Since 1,2-di-, 1,1,2-tri- or 1,1,2,2-tetra-substituted ethylenic bond has a selective reactivity towards polymerizable aromatic compound as styrene, α-methyl styrene, vinyl toluene, t-butyl styrene and the like, a higher grafting rate can be attained with the aforesaid particulate crosslinked polymer coupled with the polymerizable aromatic compound.

It is of course possible to use, besides the required polymerizable aromatic compound, other polymerizable monomers for the preparation of said linear polymer chains as desired. Any of the mono-functional polymerizable monomers hereinbefore stated.

Furthermore, since a certain degree of branching or crosslinking is permissible according to circumstances, a limited amount of crosslinking monomer may be used together, as desired.

The invention is characterized in that the aforesaid linear polymer chains to be chemically bonded to the crosslinked polymer particles should contain a metallic element which is in the left side of the line linking B with Si, As, Te and At, in the long form of the Periodic Table, excluding the members on said line.

As already stated, such metallic element can be advantageously introduced into the linear polymer chains in two different ways.

In one method, a metal containing monomer is present in the abovesaid second stage of reaction together with a polymerizable aromatic compound and other optional polymerizable monomers.

Examples of metal containing monomers are metal esters or metal salts of polymerizable organic acids as acrylic acid, methacrylic acid, itaconic acid, maleic acid and the like, vinyl metals and styryl metals. The metal may also carry hydroxyl groups, an organic acid residue, an alkyl, a substituted alkyl or the like. More specifically, they may be zinc mono (meth) acrylate, zinc di (meth) acrylate, tributyl tin (meth) acrylate, dibutyl tin di (meth) acrylate, dihydroxy Al (meth) acrylate, hydroxy Al di (meth) acrylate, (meth) acryloyl ferrocene, furyl (meth) acryloyl ferrocene, (meth) acryloxy Zr octate, (meth) acryloxy Zr laurate, isopropyl (meth) acryloyl diisostearoyl titanate, isopropyl di (meth) acryloyl isostearoyl titanate, triethyl Ge (meth) acrylate, styryl triethyl germanium, vinyl triethyl germanium, diphenyl Pb di (meth) acrylate, styryl triethyl Pb, and the monomeric compounds represented by the formulae:

$$(CH_2=CH)_xM_nR_{n-x};$$
$$(CH_2=CHC_6H_4)_xM_nR_{n-x};\text{ and}$$
$$(CH_2=CR'COO)_xM_nR_{n-x}$$

wherein M stands for a metallic element; R is alkyl, a substituted alkyl, phenyl, a substituted phenyl or hydroxyl; R' is hydrogen or methyl; n is the valency of said metallic element; x stands for an integer of less than n.

In another method, the composite acrylic resin particles are first prepared and then treated with a metallic compound to introduce the metallic element to the linear polymer chains through esterification or an ester-exchange reaction. In this method, the following metallic compounds may be successfully used: magnesium chloride, calcium oxide, chromium chloride, zinc oxide, tributyl tin oxide, dibutyl tin oxide, triethyl tin chloride, tribenzyl tin chloride, diethyl aluminium chloride, aluminium hydroxide, and other metal oxides, halogenides, hydroxides and the like. These compounds may easily react with carboxyl groups or neutralized carboxyl groups in the linear polymer and introduce the metallic elements into said polymer through esterification or ester-exchange reaction. An alkaline metal and an alkaline earth metal as Na, Ka and Ca may be used in the form of hydroxide and reacted and combined with: carboxyl group of the linear polymer, through ionic bonds. By the adoption of either method, the present composite resin particles each comprise a particulate crosslinked polymer to which a number of substantially linear, metal-containing polymer chains are chemically bonded can be easily obtained.

It will be appreciated that there are no particular limitations on the kinds of radically polymerizable monomers used for the preparation of linear polymer chains. And, hence, the linear polymer chains can be freely designed, and various desired properties may be given to the present composite resin particles by varying the grafting monomers. For example, when the aforesaid monomers (1) or (3) are selected as a part of the monomers to be used for the preparation of linear polymer chains, the composite resin particles having carboxyl or amino containing polymer chains can be obtained, which particles have a self-catalytic function in curing, high reactivity with an epoxy compound and are useful in anionic or cationic electrodeposition. Selection of the hydroxyl containing monomer (2) is of importance to produse composite resin particles which are to be compounded with an isocyanate compound and cured to give a tough coating.

The aforesaid monomers (4), addition products of hydroxyl containing monomers and monoisocyanate compounds, and addition products of isocyanate containing monomers and monoamide compounds are useful for giving the composite crosslinked resin particles with highly crystalline polymer chains, which are beneficial to the products in giving the structural viscosity and rheology controllable functions, thereto. Various functional groups, thus, may be carried on the linear polymer chains and utilized as reactive sites or made the best of the characteristic properties thereof. It is of course possible to select a particular combination of functional monomers and make the most of the characteristic properties of the respective functional groups.

(2) The particles wherein the polymer core and polymer chains are coupled with each other through semi-interpenetration and the metal element is included in the polymer chains. In this type of composite resin particles, the core portion of the crosslinked polymer is first prepared by using a conventional means, as an emulsion polymerization, a non-aqueous dispersion polymerization, a solution polymerization and the like, and by adopting an optional pulverization and sieving step, as desired.

Next, a solution polymerization of polymerizable ethylenic compounds, including a metal containing monomer, is effected in an organic solvent and in the presence of said crosslinked polymer particles, thereby forming the desired composite resin particles.

As the polymerizable ethylenic compounds and metal containing monomers, any of the members hereinbefore stated may be satisfactory used.

In this method, since a part of the polymerizable monomers can get into the crosslinked polymer core particles by infiltration, both in the inside of the intended poymerization and the outside of the crosslinked polymer particles. Therefore, the thus obtained particles have the characteristic semi-interpenetrating polymer network structure, wherein a part of the respective metal-containing linear polymer chain penetrates into the crosslinked polymer core particle and the remaining part extends outwardly therefrom.

It is also possible to obtain the same type of composite resin particles by first preparing the composite resin particles without using the metal-containing monomer and then reacting the latter with a metallic compound. As previously stated in the preceeding paragraph (1).

(3) The particles wherein a particulate crosslinked polymer core and a number of substantially linear polymer chains are coupled with each other both by chemical bonding and semi-interpenetration and a metal element is included in the polymer chains.

As will be easily understood from the foregoing, such particles may be advantageously obtained by first preparing the composite resin particles each comprising a particulate crosslinked polymer core and a number of substantially linear polymer chains chemically bonded to said core, and then effecting the solution polymerization of the addition polymerizable monomers in the presence of said composite resin particles. For the introduction of the desired metal element in the polymer chains, either a method of using a metal-containing monomer as a part of a chain constituting monomer or a method of reacting a metallic compound with the formed polymer chains may be satisfactorily used.

(4) The particles each comprising a particulate crosslinked polymer core and a number of substantially linear polymer chains coupled with said core either by way of chemical bonding, semi-interpenetration of both and containing a metal element in the polymer core.

For the preparation of this type of composite resin particles, the metal-containing, crosslinked polymer core particles are first prepared by using a metal-containing monomer as a part of the core constituting monomers or by reacting the core particles with a metallic compound, and then the desired linear polymer chains are formed by the adoption of addition polymerization technique or solution polymerization technique or both.

If desired, a metal element may also be introuduced in said chain polymer.

In either type of the abovementioned composite resin particles, a number of substantially linear polymer chains are coupled with the crosslinked polymer core, and therefore, when the resin particles are added to a combination of a film-forming resin and a solvent, mutual access of the resin particles and agglomeration are effectively controlled by said chain portions, whereby an excellent dispersion stability of the resin particles in the system can be obtained.

Since the chain polymer has a good compatibility with the hydroxyl group containing film-forming resin, said property may contribute to the improvement in the finish appearance of the coating. Furthermore, the chain polymer is serviceable for the stabilization of the dispersion of pigments if any, by wrapping the same, and for the improvement in gloss, transparency and appearance of the coating because they posses a certain degree of film-forming properties.

The core portion is crosslinked and therefore, the composite resin particles may exert a pigment filler effect and a hard resin effect, giving an excellent two component polyurethane coating having improved drying fastness and polishing resistance.

Besides the above, the present composite resin particles are characterized in that a metal element is included in the polymer chains or polymer core or both of them, which metal can exert a catalytic action on the urethanation reaction. Therefore, when the present composite resin particles are present in a two component polyurethane coating, the reaction of the hydroxyl group containing film-forming resin and the polyisocyanate hardener is greatly enhanced at around the composite resin particles and the curing properties and drying properties are greatly improved.

As to the metallic content of the composite resin particles, it may be widely varied with the specific metal used. For example, in the case of tin, the desired catalytic action may be expected with a 50 ppm tin metal level, and however, it is usually selected in a range of 0.1 to 2 % (as Sn) of the total solid of the composite resin particles. Furthermore, when the composite resin particles include both active hydrogen bearing groups and metal elements, there are such additional effects that the reaction of the respective particles and the isocyanate compound may also be enhanced and the drying properties are markedly improved.

In the present two component polyurethane coating, the abovesaid composite resin particles are compounded with a hydroxyl group containing film-forming resin as an acrylic resin, a vinyl resin, a polyester resin (including alkyd resin) and a polyether resin, in a solid weight ratio of 1:99 60:40 preferably 5:95 30:70. This is because if the amount of composite resin particles is less than 1% by weight of the total solid of the main component comprising the composite resin particles, hydroxyl group containing film-forming resin and solvent, there is a reduction in drying properties, whereas if it exceeds the upper limit of 60%, there is a decrease in levelling characteristic of the resulted composition, giving an inferior coating appearance.

As already stated, various functional groups may be introduced in the linear polymer chains of the present composite resin particles, to achieve the particular properties possessed by them. The inventors have found that when the linear polymer contains an active hydrogen containing group, such as hydroxyl and amino group, an acidic group or a basic group, the drying properties of the coating composition is greatly increased because of the improvement in reactivities of the resin particles themselves and of the surrounding atmosphere thereof.

That is, when hydroxyl groups or amino groups capable of reacting with isocyanate groups of the hardener are present in the linear polymer chains, the composite resin particles per se may take part into the reaction with the hardener, participating directly in the improvement in the drying properties of the composition because of the increase in setting and high polymerization tendencies of the particles and in the crosslinking density thereof.

The presence of carboxyl groups and dialkyl amino groups in the polymer chains may participate in the accelerated urethane reaction in the vicinity of the crosslinked resin particles through catalytic action. Thus, the surrounding resin is vigorously reacted and apparently crosslinked, and the drying properties of the composition can be markedly improved. When urea, a urethane, an acid amide and other groups whose cohesive energies are as high as 6500 cal/mol or more, are present in the linear polymer chains, there is an increase in an initial drying property of the composition due to the increase in the glass transition temperature (Tg) of the composite resin. Furthermore, hydrogen bonds are prove to be generated between the composite resin particles and between the particle and the film-forming resin, which are equivalent to weakly crosslinked structures. For this reason, the initial drying properties of the composition is further improved and the scratch resistance and polishing resistance of the coating are markedly improved.

Thus, in the present invention, by the adoption of the aforesaid composite resin particles, it is possible to provide a two component polyurethane coating which is excellent in drying properties and application characteristics and capable of resulting in a coating with excellent gloss, transparency and finishing appearance, as well as polishing resistance.

As the hardener component, any of the known polyisocyanate compounds and their prepolymers customarily used in this type of two component polyurethane coatings may be successfully and advantageously used. Therefore, in this invention, the term "polyisocyanate compound" shall mean both the polyisocyanate compound itself and a prepolymer therof. The weight ratio of said hardener component to the resinous materials may be widely varied and however, in the practical sense, the equivalent ratio of the isocyanate groups in the hardener component to the hydroxy groups of the principal component resins (if the linear polymer chains contain hydroxyl groups, the sum of said hydroxyl groups and those of the hydroxyl group containing film-forming resin) is usually selected in a range of 0.5 to 2.0.

Other essential components of a hydroxyl group containing film-forming resin and a solvent may be of any member customarily used in this type of two component polyurethane coating. To the principal component (A) and to the hardener component (B) of this invention, any of the additives, auxiliaries as, for example, ultra-violet ray absorbers, pigments, catalysts, solvents and the like may be added if desired.

In using the present coating composition, the principal component (A) comprising a hydroxyl group containing film-forming resin, composite resin particles and a solvent, and the hardener component (B) are mixed well, diluted with an appropriate volatile medium as a thinner, and the thus diluted coating is applied in a conventional way as by spraying. The thus prepared coating has a suitable pot-life for spraying or coating, and is excellent in application characteristics and drying, and curing properties. The coating obtained is excellent in smoothness, gloss and transparency and has excellent polishing properties. Therefore, the present coating composition is quite useful for auto-repair and various coating areas in electric appliances, plastics, wood processing, building and other industries.

The invention shall be now more fully explained in the following examples. Unless otherwise stated, all parts and percentages are by weight.

REFERENCE EXAMPLE 1

Preparation of hydroxyl group containing polymer

Into a reaction vessel fitted with a stirrer, a thermometer, a nitrogen gas inlet tube and a reflux condenser, was placed 100 parts of xylene and heated in a nitrogen atmosphere to 120° C. To this, a mixture of 40 parts of styrene, 24 parts of n-butyl methacrylate, 16.9 parts of methyl methacrylate, 0.5 part of methacrylic acid, 18.6 parts of 2-hydroxyethyl methacrylate and 2.1 parts of t-butyl peroxyoctoate was dropwise added in 3 hours. After completion of said addition, the combined mixture was further reacted at the same temperature for 3 hours to obtain an acrylic resin varnish (A) having a solid content of 50% and Gardner color of less than 1, the resin having a number average molecular weight of about 8000, a Tg of 70° C., an OH value per solid of 80 and an acid value per solid of 3.3.

REFERENCE EXAMPLE 2

Preparation of dispersion stabilizer

Into a 2 liters flask fitted with a stirrer, a nitrogen gas inlet tube, a thermoregulator, a condenser and a decanter, was placed 134 parts of bishydroxy ethyl taurine, 130 parts of neopentylglycol, 236 parts of azelaic acid, 186 parts of phthalic anhydride and 27 parts of xylene and the mixture was heated while removing the formed water azeotropically with xylene. The temperature was raised to 190° C. in about 2 hours from the commencement of reflux and the reaction was continued under stirring and dehydration until the acid value (based on carboxylic acid groups) reached 145. Thereafter, the reaction mixture was allowed to cool to 140° C. and to this, 314 parts of Cardura E-10 (glycidyl versatate, trademark of Shell) was dropwise added in 30 minutes at 140° C. The mixture was stirred at the same temperature for 2 hours and then the reaction was stopped to obtain a polyester resin having an acid value of 59, a hydroxyl value of 90 and a number average molecular weight of 1054.

REFERENCE EXAMPLE 3

Preparation of dispersion stabilizer

Into a 1 liter flask fitted with a stirrer, a thermoregulator, dropping funnels, a nitrogen gas inlet tube and a condenser, was placed 140 parts of ethyleneglycol monomethyl ether and 140 parts of xylene, and the mixture was heated to 120° C. To this, a monomer mixture of 74 parts of methyl methacrylate, 70 parts of 2-ethylhexylacrylate, 24 parts of 2-hydroxyethyl methacrylate, and 12 parts of methacrylic acid, added with 5 parts of azobisisobutyronitrile and a solution of 20 parts of N-(3-sulfopropyl)-N-methacryloyloxyethyl-N,N-dimethyl ammonium betained in 150 parts of ethyleneglycol monoethyl ether were simultaneously and dropwise added in 3 hours. After 30 minutes from the completion of said addition has elapsed, a solution of 0.4 part of t-butylperoxy-2-ethylhexanoate in 8 parts of ethylene glycol monomethyl ether was added and the combined mixture was kept at 120° C. for 1 hour and thereafter, the solvent was removed off to obtain an amphoionic group containing acrylic resin having a nonvolatile content of 92%.

REFERENCE EXAMPLE 4

Preparation of monomer containing two polymerizable ethylenic groups each having different co-reactivity Into a 1 liter flask fitted with a stirrer, an air inlet tube, a thermoregulator, and a condenser, was placed 430 parts of mono-butyl maleate and 1.6 parts of hydroquinone and the mixture was heated to 150° C. To this, were dropwise added 373 parts of glycidyl methacrylate in 20 minutes and the combined mixutre was maintained at 150° C. for 60 minutes. The reaction was stopped at the stage when the resinous acid value reached 3 KOH mg/g or less.

REFERENCE EXAMPLE 5

Preparation of composite crosslinked resin particles

Into a 1 liter flask fitted with a stirrer, a thermoregulator, a dropping funnel, a nitrogen gas inlet tube and a condenser, was placed 330 parts of deionized water and the temperature was raised to 80° C. Separately, a pre-emulsion was prepared by providing an aqueous dispersion stabilizer solution comprising 12 parts of the amphoionic group containing polyester resin obtained in Reference Example 2, 1.2 parts of dimethyl ethanolamine and 104 parts of deionized water, and gradually adding, while stirring in a disper, a mixture of 66 parts of methyl methacrylate, 60 parts of n-butyl acrylate, 14 parts of allyl methacrylate and 40 parts of ethyleneglycol dimethacrylate thereto. An aqueous initiator solution was also prepared in a separate vessel, by mixing 2 parts of azobiscyanovaleric acid, 1.3 parts of dimethyl ethanolamine and 40 parts of deionized water. To the aforesaid reaction flask, the initiator solution and the pre-emulsion were dropwise added, in 80 minutes and 60 minutes, respectively. However, the addition of said pre-emulsion was started after 10 minutes from the commencement of addition of said initiator solution has elapsed. Then, the combined mixture was kept standing at 80° C. for 30 mintues, dropwise added with a mixture of 12 parts of styrene, 2 parts of methyl methacrylate, 4 parts of 2-hydroxyethyl methacrylate, and 2 parts of zinc monomethacrylate, and a solution of 0.8 part of azobiscyanovaleric acid, 0.6 part of dimethyl ethanolamine and 20 parts of deionized water in 20 mintues, and the combined mixture was aged for 1 hour. The thus obtained emulsion was then subjected to a freeze-drying to obtain Zn containing composite crosslinked resin particles. X-ray fluorescent analysis showed that the zinc content was 4000 ppm of the total solid. The mean diameter of said particles in the emulison was 150 nm. These particles are hereinafter called as gellated particles (a).

REFERENCE EXAMPLE 6

Preparation of composite crosslinked resin particles

Into a similar reaction vessel as used in Reference Example 5, was placed 330 parts of deionized water and heated to 80° C. Separately, an aqueous solution of dispersion stabilizer was prepared from 23 parts of the amphoionic group containing polyester resin obtained in Reference Example 2, 4 parts of dimethyl ethanolamine and 160 parts of deionized water, to which a monomer mixture of 30 parts of methyl methacrylate, 40 parts of n-butyl methacrylate, 14 parts of the monomer of Reference Example 4 and 56 parts of ethyleneglycol dimethacrylate was added to obtain a pre-emulsion. An aqueous initiator solution was also prepared from 2 parts of azobiscyanovaleric acid, 1.3 parts of dimethyl ethanolamine and 40 parts of deionized water. To the abovesaid reaction vessel, said aqueous initiator solution was dropwise added in 65 minutes. After elapsing 10 has elapsed minutes from the commencement of dropping of said aqueous solution, dropping of the abovesaid pre-emulsion was added in 45 minutes. After completion of said addition, the combined mixture was maintained at 80° C. for 20 minutes. Thereafter, a mixed aqueous solution of 0.8 part of azobiscyanovaleric acid, 0.6 part of dimethyl ethanolamine and 20 parts of deionized water was dropwise added in 20 minutes. After elapsing 10 minutes from the start of said addition of mixed aqueous solution has elapsed, a simultaneous addition of a mixture of 18 parts of styrene, 8 parts of methyl methacrylate, 23 parts of n-butyl acrylate, 10 parts of 2-hydroxyethyl methacrylate and 1 part of tributyl tin methacrylate was started and the said addition was ended in 20 minutes. After completion of said additions, the combined mixture was maintained at 80° C. for 90 minutes to obtain an emulsion. The said emulsion was then subjected to a freeze-drying to obtain tin containing composite crosslinked resin particles. From the X-ray fluorescent analysis, it was confirmed that the tin content was 1400 ppm of the total solid. These particles are hereinunder called as gellated particles (b).

REFERENCE EXAMPLE 7

Preparation of composite crosslinked resin particles

Repeating the same procedures as stated in Reference Example 6, but substituting 40 parts of the amphoionic group containing acryl resin obtained in Reference Example 3 for 23 parts of the amphoionic group containing polyester resin and 10 parts of n-butyl methacrylate for 10 parts of 2-hydroxy ethyl methacrylate, tin containing composite crosslinked resin particles was obtained. X-ray fluorescent analysis showed that the tin content was 1300 ppm of the total solid. These particles are hereinunder called as gellated particles (c).

REFERENCE EXAMPLE 8

Preparation of composite crosslinked resin particles

Into a 1 liter flask fitted with a stirrer, a thermoregulator, a dropping funnel, a nitrogen gas inlet tube and a condenser, was placed 330 parts of deionized water and the temperature was raised to 80° C. Separately, a pre-emulsion was prepared by first providing an aqueous dispersion stabilizer solution comprising 16 parts of the amphoionic group containing polyester resin obtained in Reference Example 2, 1.6 parts of dimethyl ethanolamine and 104 parts of deionized water, and then gradually adding, while stirring in a disper, a mixture of 14 parts of methyl methacrylate, 28 parts of n-butyl acrylate, 18 parts of allyl methacrylate and 60 parts of 1,6-hexanediol dimethacrylate thereto. An aqueous initiator solution was also prepared in a separate vessel, by mixing 1.6 parts of azobiscyanovaleric acid, 1.1 parts of dimethyl ethanolamine and 40 parts of deionized water. To the aforesaid reaction flask, the aqueous initiator solution was dropwise added in 45 minutes. The pre-emulsion was also dropwise added and however, the pre-emulsion addition was started after elapsing 5 minutes from the start of addition of said initiator solution and ended in 35 minutes.

After completion of the addition of the initiator solution, the combined mixture was aged at the same temperature for 30 minutes. Thereafter, an aqueous initiator solution comprising 1 part of azobiscyanovaleric acid, 0.7 part of dimethyl ethanolamine and 30 parts of deionized water was dropwise added in 45 mintues. After 5 minutes has elapsed from the start of said addition, simultaneous and dropwise addition of a monomer mixture of 28 parts of styrene, 16 parts of methyl methacrylate, 33 parts of n-butyl methacrylate, 3 parts of methacrylic acid and 3.2 parts of dimethyl ethanolamine was started and said addition was ended in 30 minutes. Thereafter, the combined mixture was aged at a same temperature for 60 minutes, and the emulsion was then subjected to a freeze-drying to obtain the powder. 60 parts of thus obtained powder were placed in a 500 ml round bottomed flask and 180 parts of xylene were added thereto. In an evaporator, the powders were dispersed in xylene at 70° C., added with 4.3 parts of dibutyl tin oxide and the mixture was further stirred for about 20 minutes. At the stage where no further dehydration was observed, the reaction was stopped and the mixture was added with xylene to adjust the solid content to 30%. X-ray fluorescent analysis showed that the tin content of thus obtained particles was 8500 ppm of the total solid. The thus obtained particles are hereinunder called as gellated particles (d).

REFERENCE EXAMPLE 9

Preparation of composite crosslinked resin particles

The same procedures as stated in Reference Example 5 were repeated excepting substituting a monomer mixture of 10 parts of styrene, 4 parts of n-butyl acrylate and 4 parts of 2-hydroxyethyl methacrylate and a monomer aqueous solution of 2 parts of calcium diacrylate in 18 parts of deionized water, for the monomer mixture to be reacted in the second stage of the reactions, to obtain calcium containing composite crosslinked resin particles. The calcium content of the total solid was 1800 ppm. These particles are hereinafter called as gellated particles (e).

REFERENCE EXAMPLE 10

Preparation of crosslinked resin particles for comparison sake

Into a similar reaction vessel as used in Reference Example 5, was placed 330 parts of deionized water and heated to 80° C. To this, an aqueous solution of 2 parts of azobiscyanovaleric acid, 1.3 parts of dimethyl ethanolamine and 40 parts of deionized water was dropwise added in 80 minutes and a pre-emulsion of 40 parts of the dispersion stabilizer obtained in Reference Example 3, 1.2 parts of dimethyl ethanolamine, 104 parts of deionized water, 95 parts of methyl methacrylate, 75 parts of n-butyl acrylate and 30 parts of ethyleneglycol dimethacrylate was simultaneously, but starting at the moment after elapsing 10 minutes from the commencement of said addition of the aqueous solution, and dropwise added in 60 minutes. After completion of the addition of the aqueous solution, the combined mixture was maintained at the same temperature for 90 minutes to obtain an emulsion containing the particles having a mean diameter of 160 nm.

The emulsion was subjected to a spray-drying to obtain the crosslinked resin particles, which are hereinafter referred to as gellated particles (f).

REFERENCE EXAMPLE 11

Preparation of crosslinked resin particles for comparison sake

The same procedures as stated in Reference Example 10 were repeated excepting for revising the amounts of methyl methacrylate to 60 parts, n-butyl acrylate to 60 parts and ethyleneglycol dimethacrylate to 80 parts. The thus obtained crosslinked resin particles are hereinafter referred to as gellated particles (g).

EXAMPLE 1 to 7 AND COMPARATIVE EXAMPLES 1 TO 3

Coating compositions were prepared by pre-mixing each indicated amounts (in Table 2) of the acrylic resin varnish A obtained in Reference Example 1, the gellated particles (a) to (h) obtained in Reference Examples 5 to 11 and the mixed solvent shown in Table 1, adding the indicated amounts (in Table 2) of hardener component and diluting the thus obtained mixtures with the same mixed solvent to sprayable viscosities.

Each composition was then applied by spraying onto a soft steel plate (0.8 mm thickness) so as to give a dry thickness of 50 to 60 μ, and allowed to dry under 20° C. and 75% relative humidity conditions.

TABLE 1

| mixed solvent | |
|---|---|
| Toluene | 40 parts |
| n-butyl acetate | 30 |
| xylene | 20 |
| Solvesso #100 (aromatic hydrocarbon mixture, trademark of Exon) | 10 |

The thus obtained coatings were evaluated as follows.

(1) Drying properties:
Half-curing and complete curing times (minutes) were determined by the method of JIS K 5400 5.8.

(2) Water-spot resistance
This test was carried out with: the coated plate after being maintained 16 hours rom the preparation thereof.

2 cc of pure water was placed on the coating as a spot, after elapsing 8 hours, mopped up and the water mark was visually evaluated.

O ... no abnormality
X ... uneven loss of gloss, and water mark (3) Pencil hardness
After keeping the coated plate for 48 hours, pencil hardness was determined by the method of JIS K 5400 6.14.

(4) 60° specular gloss JIS K 5400 6.7 method was used.

(5) Transparency by visual observation
O ... no turbidity
X ... turbid

The test results are shown in Table 2.

TABLE 2

| Example | 1 | 2 | 3 | 4 |
|---|---|---|---|---|
| Formulation | | | | |
| acrylic resin varnish A | 68 | 68 | 68 | 68 |
| gellated particles a | 6 | | | |
| gellated particles b | | 6 | | |
| gellated particles c | | | 6 | |
| gellated particles d | | | | 20 |
| gellated particles e | | | | |
| gellated particles f | | | | |
| gellated particles g | | | | |
| mixed solvent | 16.2 | 16.0 | 16.4 | 2.4 |
| Colonate EH* | 9.8 | 10.0 | 9.6 | 9.6 |
| gellated particles % | 15 | 15 | 15 | 15 |
| NCO/OH ratio | 1.0 | 1.0 | 1.0 | 1.0 |
| Test results | | | | |
| half-curing time | 110 | 90 | 100 | 90 |
| complete-curing time | 180 | 150 | 160 | 150 |
| water-spot resistance | O | O | O | O |
| pencil hardness | HB | F | F | F |
| 60° specular gloss | 92 | 92 | 92 | 92 |
| transparency | O | O | O | O |

| Example | 5 | 6 | 7 |
|---|---|---|---|
| Formulation | | | |
| acrylic resin varnish A | 68 | 68 | 63 |
| gellated particles a | | | |
| gellated particles b | | 1.8 | 13.5 |
| gellated particles c | | | |
| gellated particles d | | | |
| gellated particles e | 6 | | |
| gellated particles f | | | |
| gellated particles g | | | |
| mixed solvent | 16.2 | 20.5 | 13.7 |
| Colonate EH* | 9.8 | 9.7 | 9.8 |
| gellated particles % | 15 | 5 | 30 |
| NCO/OH ratio | 1.0 | 1.0 | 1.0 |
| Test results | | | |
| half-curing time | 110 | 110 | 80 |
| complete-curing time | 180 | 200 | 120 |
| water-spot resistance | O | O | O |
| pencil hardness | HB | HB | F |
| 60° specular gloss | 92 | 94 | 90 |
| transparency | O | O | O |

| Comparative Example | 1 | 2 | 3 |
|---|---|---|---|
| Formulation | | | |
| acrylic resin varnish A | 68 | 68 | 68 |
| gellated particles a | | | |
| gellated particles b | | | 0.2 |
| gellated particles c | | | |
| gellated particles d | | | |
| gellated particles e | | | |
| gellated particles f | 6 | | |

TABLE 2-continued

| | | | |
|---|---|---|---|
| gellated particles g | | 6 | |
| mixed solvent | 16.4 | 16.4 | 22.2 |
| Colonate EH* | 9.6 | 9.6 | 9.6 |
| gellated particles % | 15 | 15 | 0.5 |
| NCO/OH ratio | 1.0 | 1.0 | 1.0 |
| Test results | | | |
| half-curing time | 150 | 150 | 200 |
| complete-curing time | 250 | 240 | 300 |
| water-spot resistance | O | O | X |
| pencil hardness | HB | HB | B |
| 60° specular gloss | 91 | 91 | 94 |
| transparency | X | X | O |

*... HMDI prepolymer, trademark of Nihon Polyurethane K.K.

REFERENCE EXAMPLE 12

Preparation of hydroxyl group containing polymer

Into a reaction vessel fitted with a stirrer, a thermoregulator, a dropping funnel, a nitrogen gas inlet and a condenser, was placed 50 parts of xylene and 50 parts of butyl acetate and the mixture was heated, under nitrogen stream, to 120° C. To this, a mixture of 30 parts of styrene, 33.7 parts of methyl methacrylate, 0.5 part of methacrylic acid, 19.6 parts of n-butyl acrylate, 16.2 parts of 2-hydroxyethyl methacrylate and 2 parts of t-butyl peroxyoctoate was dropwise added in 3 hours and then the combined mixture was further reacted at the same temperature for 3 hours to obtain a resinous varnish (B). This varnish had a non-volatile content of 50%, OH value of 70 mg KOH/solid and acid value of 3 mg KOH/solid and was a clear solution.

REFERENCE EXAMPLE 13

Preparation of dispersion stabilizer

Into a reactor fitted with a stirrer, a thermoregulator, a nitrogen gas inlet, a decanter, and a condenser, was placed 1500 parts of 12-hydroxystearic acid and heated. Stirring was commenced at 72° C. and the temperature was raised to 220° C. to effect an esterification, while removing the formed water out of the system. At the stage when the acid value reached 35, the reaction was stopped and the reaction mixture was allowed to cool to a room temperature. Next, a mixture of 126 parts of glycidyl methacrylate, 3 parts of hydroquinone, 3 parts of 2-methyl imidazol and 775 parts of butyl acetate was added to the said reactor, and the combined mixture was heated, under stirring, to 150° C. and reacted at the same temperature for about 1 hour to obtain the intermediate product (a) having a non-volatile content of 67% and an acid value of 0.3. Into an another reactor fitted with a stirrer, a thermoregulator, a nitrogen gas inlet, a condenser and a dropping funnel, were placed 180 parts of xylene and the temperature was raised, under stirring and under nitrogen atmosphere, to 110° C. To this, a mixture of 150 parts of the intermediate product (a), 47.5 parts of methyl methacrylate, 2.5 parts of acrylic acid and 5.5 parts of t-butyl peroxyoctoate was dropwise added in 3 hours. After completion of said addition, the mixture was maintained at the same temperature for 3 hours to obtain a dispersion stabilizer having a non-volatile content of 40%.

REFERENCE EXAMPLE 14

Preparation of a dispersion of metal containing crosslinked resin particles (h)

Into a similar reaction vessel as used in Reference Example 12, was placed 223 parts of Shell-sol 340 (aliphatic hydrocarbon mixture, trademark of Showa Shell Sekiyu K.K.) and heated, under stirring and under nitrogen atmosphere, to 100° C. While maintaining the same temperature and continuing stirring, a mixture of 80.5 parts of methyl methacrylate, 6 parts of glycidyl methacrylate, 6 parts of methacrylic acid, 0.5 part of diphenyl lead dimethacrylate, 17.5 parts of the dispersion stabilizer obtained in Reference Example 13 and 1 part of azobisisobutyronitrile was dropwise added in 4 hours. After completion of said addition, 1 part of 2-methyl imidazol was added and the combined mixture was heated to 120° C and reacted at the same temperature for 8 hours to obtain a dispersion of metal containing crosslinked resin particles, whose solid content was 30 %. Thus obtained dispersion is hereinafter called as dispersion (h). From X-ray fluorescent analysis, it was found that the lead content was 17000 ppm of the total solid.

REFERENCE EXAMPLE 15

Preparation of resinous varnish containing resin particles

Into a similar reactor as used in Reference Example 12, was placed 50 parts of the dispersion (h) obtained in Reference Example 14, 50 parts of xylene and 15 parts of butyl acetate and the mixture was heated, under nitrogen atmosphere, to 120° C. To this, a mixture of 25.5 parts of styrene, 28.6 parts of methyl methacrylate, 0.4 parts of methacrylic acid, 16.7 parts of n-butyl acrylate, 13.8 parts of 2-hydroxyethyl methacrylate, and 2 parts of t-butyl peroxyoctoate was dropwise added in 3 hours. After completion of said addition, the combined mixture was maintained at the same temperature for 3 hours to obtain a resinous varnish (C) containing the composite resin particles.

REFERENCE EXAMPLE 16

Preparation of dispersion stabilizer

Into a similar reaction vessel as used in Reference Example 12, was placed 73.5 parts of sodium salt of taurine, 100 parts of ethyleneglycol and 200 parts of ethyleneglycol monomethyl ether and the mixture was, while stirring, heated to 120° C. At the state when the mixture reached a stirrable condition, a mixed solution of 470 parts of Epicoat 1001 (bisphenol A-glycidyl ether type epoxy resin, epoxy equivalent 470, trademark of Shell Chem. Co.) and 400 parts of ethyleneglycol monomethyl ether was dropwise added in 2 hours. After completion of said addition, the combined mixture was stirred and heated for 20 hours. The reaction product was then purified and dried to obtain 518 parts of modified epoxy resin, whose acid value was 49.4 and sulfur content (determined by X-ray analysis) was 2.8 %.

REFERENCE EXAMPLE 17

Preparation of metal containing composite crosslinked resin particles

Into a 1 liter flask fitted with a stirrer, a thermoregulator, a dropping funnel, a nitrogen gas inlet and a condenser, was placed 306 parts of deionized water and heated to 80° C.

Separately, an aqueous solution of dispersion stabilizer was prepared by using 30 parts of the amphoionic group containing polyester resin obtained in Reference Example 2, 3 parts of dimethyl ethanolamine and 170 parts of deionized water and while stirring in a disper, a monomer mixture of 40 parts of methyl methacrylate, 4 parts of n-butyl acrylate, 48 parts of ethyleneglycol dimethacrylate, 20 parts of the monomer bearing two unsaturation bonds whose reactivities differ from each other obtained in Reference Example 4, and 8 parts of tributyl tin methacrylate was gradually added thereto, to obtain a pre-emulsion. An aqueous initiator solution was also prepared by mixing 2 parts of azobiscyanovaleric acid, 1.2 parts of dimethyl ethanolamine and 40 parts of deionized water. To the abovesaid reaction flask, the thus obtained initiator solution was dropwise added in 80 minutes and after elapsing 10 minutes had elapsed from the commencement of said addition of initiator solution, the aforesaid pre-emulsion was likewise added in 60 minutes. Thereafter, the combined mixture was allowed to stand at the same temperature for 30 minutes and then a monomer mixture of 32 parts of styrene, 24 parts of methyl methacrylate, 12.8 parts of n-butyl acrylate and 11.2 parts of 2-hydroxyethyl methacrylate and an aqueous solution of 1.0 part of azobiscyanovaleric acid, 0.6 part of dimethyl ethanolamine and 20 parts of deionized water were simultaneously and dropwise added in 40 minutes. Finally, the combined mixture was aged at the same temperature for 1 hour to obtain an emulsion, which was then subjected to a freeze-drying to obtain tin containing, composite crosslinked resin particles (i). X-ray fluorescent analysis showed that the tin content was 11000 ppm of the total solid.

REFERENCE EXAMPLE 18

Preparation of metal containing composite crosslinked resin particles

The same procedures as stated in Reference Example 17 were repeated excepting the amount of tributyl tin methacrylate was revised to 3.5 parts. The thus obtained tin-containing composite crosslinked resin particles are hereinafter called gellated particles (j). The tin content of the resin particles (j) was 5000 ppm of the total solid.

REFERENCE EXAMPLE 19

Preparation of metal containing composite crosslinked resin particles

Into a similar reactor as used in Reference Example 12, was placed 306 parts of deionized water and heated to 80° C. Separately, an aqueous solution of dispersion stabilizer was prepared by using 30 parts of the amphoionic group containing polyester resin obtained in Reference Example 2, 3 parts of dimethyl ethanolamine and 190 parts of deionized water, and while stirring in a disper, a monomer mixture of 80 parts of methyl methacrylate, 18 parts of n-butyl acrylate, 80 parts of ethyleneglycol dimethacrylate, 2 parts of methacrylic acid and 20 parts of allyl methacrylate was gradually added thereto, to obtain a pre-emulsion. An aqueous initiator solution was also prepared by mixing 2 parts of azobiscyanovaleric acid, 1.2 parts of dimethyl ethanolamine and 40 parts of deionized water. To the aforesaid reactor, the thus obtained aqueous initiator solution was dropwise added in 80 minutes and after elapsing 10 minutes from the commencement of said addition of initiator solution, the pre-emulsion was likewise added in 60 minutes. Thereafter, the combined mixture was aged at the same temperature for 1 hour. 383 parts of the thus obtained emulsion containing crosslinked particles, 3.5 parts of tributyl tin oxide and 200 parts of butyl acetate was placed in a round-bottomed flask and, while maintaining the temperature at 70° C., the mixture was stirred in an evaporator until no more dehydration was observed, to obtain a butyl acetate dispersion having a non-volatile content of 40%.

Into a similar reactor as used in Reference Example 12, was placed 296 parts of thus obtained butyl acetate dispersion, 117 parts of butyl acetate, 10 parts of styrene, 10 parts of methyl methacrylate and 10 parts of n-butyl acrylate and the mixture was heated to 110° C. Next, an initiator solution comprising 1 part of t-butyl peroxy 2-ethyl hexanoate and 50 parts of butyl acetate was dropwise added in 30 minutes and the combined mixture was aged at the same temperature for 3 hours, to obtain a butyl acetate dispersion of tin-containing composite crosslinked resin particles (solid content 30%). The thus obtained resin particles are hereinunder referred to as gellated particles (k). The tin content was 9200 ppm, of the total solid.

REFERENCE EXAMPLE 20

Preparation of metal-containing composite crosslinked resin particles

Into a similar reactor as used in Reference Example 12, was placed 292 parts of deionized water and heated to 80° C. Separately, an aqueous solution of dispersion stabilizer was prepared by using 24 parts of the amphoionic group containing epoxy resin obtained in Reference Example 16, 2.4 parts of dimethyl ethanolamine and 170 parts of deionized water and while stirring in a disper, a monomer mixture of 40 parts of methyl methacrylate, 2 parts of n-butyl acrylate, 70 parts of 1,6-hexanediol dimethacrylate, 20 parts of the monomer containing two unsaturation bonds each having different reactivities obtained in Reference Example 4 and 8 parts of zinc monomethacrylate was gradually added thereto to obtain a pre-emulsion. An aqueous initiator solution comprising 2 parts of azobiscyanovaleric acid, 1.2 parts of dimethyl ethanolamine and 40 parts of deionized water was also prepared.

To the abovesaid reactor, thus obtained aqueous initiator solution was dropwise added in 70 minutes and after 10 minutes had elapsed from the commencement of said addition of the aqueous initiator solution, the pre-emulsion was also dropwise added in 50 minutes. Thereafter, the combined mixture was maintained at the same temperature for 30 minutes and then a monomer mixture of 20 parts of styrene, 20 parts of methyl methacrylate, 5 parts of 2-hydroxyethyl methacrylate and 15 parts of n-butyl acrylate and an initiator solution of 1.0 part of azoabiscyanovaleric acid, 0.6 part of dimethyl ethanolamine and 20 parts of deionized water were simultaneously and dropwise added in 30 minutes. Then, the combined mixture was aged at the same temperature for 1 hour to obtain an emulsion, which was subsequently spray-dried to obtain zinc containing composite crosslinked resin particles (1). The zinc content was 15000 ppm of the total solid.

REFERENCE EXAMPLE 21

Preparation of metal-containing composite crosslinked resin particles

Into a similar reactor as used in Reference Example 12, was placed 292 parts of deionized water and heated to 80° C. Separately, an aqueous solution of dispersion stabilizer was prepared by using 24 parts of the amphoionic group containing acrylic resin obtained in Reference Example 3, 2.4 parts of dimethyl ethanolamine and 170 parts of deionized water, and while stirring in a disper, a monomer mixture of 20 parts of methyl methacrylate, 12 parts of n-butyl acrylate, 60 parts of 1,6-hexanediol dimethacrylate, 20 parts of the monomer containing two unsaturation bonds each having different reactivity obtained in Reference Example 4, and 8 parts of methacryloxy zirconium octoate was gradually added thereto to obtain a pre-emulsion. An aqueous initiator solution was also prepared by mixing 2 parts of azobiscyanovaleric acid, 1.2 parts of dimethyl ethanolamine and 40 parts of deionized water.

To the abovesaid reactor, the thus obtained aqueous initiator solution was dropwise added in 80 minutes and after 10 minutes had elapsed from the commencement of said addition of the initiator solution, the pre-emulsion was also added in 60 minutes. Thereafter, the combined mixture was allowed to stand at the same temperature for 30 minutes and to this, a monomer mixture of 24 parts of styrene, 24 parts of methyl methacrylate and 32 parts of n-butyl acrylate and an aqueous solution of 1.0 part of azobiscyanovaleric acid, 0.6 part of dimethyl ethanolamine and 20 parts of deionized water were simultaneously and dropwise added in 30 minutes. Finally, the combined mixture was aged at the same temperature for 1 hour. The thus obtained emulsion was then subjected to a freeze-drying to obtain zirconium containing composite crosslinked resin particles (m). The zirconium content was 10,000 ppm of the total solid.

REFERENCE EXAMPLE 22

Preparation of dispersion of crosslinked resin particles for comparisons sake

The same procedures as stated in Reference Example 14 were repeated excepting for substituting 0.5 part of ethyl acrylate for 0.5 part of diphenyl lead dimethacrylate to obtain a dispersion of crosslinked resin particles (n). No metal was contained in these resin particles.

REFERENCE EXAMPLE 23

Preparation of crosslinked resin particles for comparison sake

Into a similar reactor as used in Reference Example 17, was placed 306 parts of deionized water and heated to 80° C. Separately, an aqueous solution of dispersion stabilizer was prepared by using 30 parts of the amphoionic group containing polyester resin obtained in Reference Example 2, 3 parts of dimethyl ethanolamine and 170 parts of deionized water and to this, a monomer mixture of 40 parts of methyl methacrylate, 4 parts of n-butyl acrylate and 48 parts of ethyleneglycol dimethacrylate was gradually added to obtain a pre-emulsion. An aqueous initiator solution of 2 parts of azobiscyanovaleric acid, 1.2 parts of dimethyl ethanolamine and 40 parts of deionized water was likewise prepared. To the abovesaid reactor, the thus obtained initiator solution was dropwise added in 80 minutes and after 10 minutes had elapsed from the commencement of said addition of initiator solution, the pre-emulsion was likewise added in 60 minutes. After completion of said addition, the combined mixture was maintained at the same temperature for 30 minutes to obtain an emulsion. The emulsion was then subjected to a freeze-drying to obtain crosslinked resin particles, which were hereinafter called as gellated particles (o). No metal was contained therein.

REFERENCE EXAMPLE 24

Preparation of resinous varnish containing composite gellated particles

Into a similar reactor as used in Reference Example 12, was placed 15 parts of the gellated particles (i) obtained in Reference Example 17, 50 parts of xylene and 50 parts of butyl acetate and the mixture was heated under a nitrogen atmosphere to 120° C. To this, a mixture of 25.5 parts of styrene, 28.6 parts of methyl methacrylate, 0.4 part of methacrylic acid, 16.7 parts of n-butyl acrylate, 13.8 parts of 2-hydroxyethyl methacrylate and 2 parts of t-butyl peroxy octoate was dropwise added in 3 hours. After completion of said addition, the combined mixture was maintained at the same temperature for 3 hours to obtain a resinous varnish (D).

REFERENCE EXAMPLE 25

Preparation of resinous varnish containing composite gellated particles

Into a similar reactor as used in Reference Example 12, was placed 30 parts of the gellated particles (i) obtained in Reference Example 17, 50 parts of xylene and 50 parts of butyl acetate and the mixture was heated under nitrogen atmosphere to 120° C. To this, a mixture of 21 parts of styrene, 23.5 parts of methyl methacrylate, 0.4 part of methacrylic acid, 13.7 parts of n-butyl acrylate, 11.4 parts of 2-hydroxyethyl methacrylate, and 2 parts of t-butyl peroxyoctoate was dropwise added in 3 hours. Thereafter, the combined mixture was maintained at the same temperature for 3 hours to obtain a resinous varnish (E).

REFERENCE EXAMPLE 26

Preparation of resinous varnish containing composite gellated particles

Into a similar reactor as used in Reference Example 12, was placed 5 parts of the gellated particles (i) obtained in Reference Example 17, 50 parts of xylene and 50 parts of butyl acetate and the mixture was heated under nitrogen atmosphere to 120° C. To this, a mixture of 28.5 parts of styrene, 32 parts of methyl methacrylate, 0.5 part of methacrylic acid, 18.6 parts of n-butyl acrylate, 15.4 parts of 2-hydroxyethyl methacrylate and 2 parts of t-butylperoxy octoate was dropwise added in 3 hours. Thereafter, the combined mixture was maintained at the same temperature for 3 hours to obtain a resinous varnish (F).

EXAMPLES 8 TO 17 AND COMPARATIVE EXAMPLE 4 TO 6

Various coating compositions were prepared by using the resinous varnishes (B to F) obtained in Reference Examples (12 to 26), dispersions of crosslinked resin particles (h and n) obtained in Reference Examples (14 and 22), gellated particles (i to m and o) obtained in Reference Examples (17 to 21 and 23) and mixed solvent S comprising 40 wt % of toluene, 30 wt % of n-butyl acetate, 20 wt % of xylene and 10 wt % of Solvesso #100 (aromatic hydrocarbon mixture, trademark of Exon) each in the amounts indicated in the following Table 3, together with Colonate EH (isocyanate prepolymer, trademark of Nihon Polyurethane) as a hardener, and diluting thus obtained concentrated compositions with the mixed solvent S to the desired sprayable viscosities. Each composition was then applied by spraying onto a soft steel plate (0.8 mm thickness) so as to give a dry thickness of 50 to 60μ and allowed to dry under 20° C. and 75% relative humidity conditions to obtain a test plate. Drying properties, water spot resistance, pencil hardness, 60° specular gloss and transparency of the respective coating were evaluated as hereinbefore stated and the test results were shown in the following Table 4.

TABLE 3

| Example | 8 | 9 | 10 | 11 |
|---|---|---|---|---|
| Formulation | | | | |
| resinous varnish B | 170 | 170 | | |
| resinous varnish C | | | 200 | |
| resinous varnish D | | | | 200 |
| resinous varnish E | | | | |
| resinous varnish F | | | | |
| particle dispersion h | 50 | | | |
| gellated particles i | | 15 | | |
| gellated particles j | | | | |
| gellated particles k | | | | |
| gellated particles l | | | | |
| gellated particles m | | | | |
| particle dispersion n | | | | |
| gellated particles o | | | | |
| mixed solvent s | 30 | 65 | 50 | 50 |
| Characteristics | | | | |
| non-volatile content % | 40 | 40 | 40 | 40 |
| composite gellated particles % | 15 | 15 | 15 | 15 |
| metal | Pb | Sn | Pb | Sn |
| hardener Colonate EH | 21.1 | 22.2 | 21.1 | 22.2 |

| Example | 12 | 13 | 14 | 15 |
|---|---|---|---|---|
| Formulation | | | | |
| resinous varnish B | 170 | 170 | 170 | 170 |
| resinous varnish C | | | | |
| resinous varnish D | | | | |
| resinous varnish E | | | | |
| resinous varnish F | | | | |
| particle dispersion h | | | | |
| gellated particles i | | | | |
| gellated particles j | 15 | | | |
| gellated particles k | | 15 | | |
| gellated particles l | | | 15 | |
| gellated particles m | | | | 15 |
| particle dispersion n | | | | |
| gellated particles o | | | | |
| mixed solvent s | 65 | 65 | 65 | 65 |
| Characteristics | | | | |
| non-volatile content % | 40 | 40 | 40 | 40 |
| composite gellated particles % | 15 | 15 | 15 | 15 |
| metal | Sn | Sn | Zn | Zr |
| hardener Colonate EH | 22.2 | 21.1 | 21.6 | 21.1 |

| Example | 16 | 17 |
|---|---|---|
| Formulation | | |
| resinous varnish B | | |
| resinous varnish C | | |
| resinous varnish D | | |
| resinous varnish E | 200 | |
| resinous varnish F | | 200 |
| particle dispersion h | | |
| gellated particles i | | |
| gellated particles j | | |
| gellated particles k | | |
| gellated particles l | | |
| gellated particles m | | |
| particle dispersion n | | |
| gellated particles o | | |
| mixed solvent s | 50 | 50 |
| Characteristics | | |
| non-volatile content % | 40 | 40 |
| composite gellated particles % | 30 | 5 |
| metal | Sn | Sn |
| hardener Colonate EH | 19.6 | 24.0 |

| Comparative Example | 4 | 5 | 6 |
|---|---|---|---|
| Formulation | | | |
| resinous varnish B | 170 | 170 | 199 |
| resinous varnish C | | | |
| resinous varnish D | | | |
| resinous varnish E | | | |
| resinous varnish F | | | |
| particle dispersion h | | | |
| gellated particles i | | | 0.5 |
| gellated particles j | | | |
| gellated particles k | | | |
| gellated particles l | | | |
| gellated particles m | | | |
| particle dispersion n | 50 | | |
| gellated particles o | | 15 | |
| mixed solvent s | 30 | 65 | 50.5 |
| Characteristics | | | |
| non-volatile content % | 40 | 40 | 40 |
| composite gellated particles % | 15 | 15 | 0.5 |
| metal | — | — | Sn |
| hardener Colonate EH | 21.1 | 21.1 | 24.7 |

TABLE 4

Test results

| Example | 8 | 9 | 10 | 11 | 12 |
|---|---|---|---|---|---|
| half-curing time | 130 | 80 | 100 | 70 | 90 |
| complete curing time | 190 | 120 | 160 | 110 | 150 |
| water spot resistance | O | O | O | O | O |
| pencil hardness | HB | F | F | F | F |
| 60° specular gloss | 83 | 91 | 92 | 94 | 92 |
| transparency | X | O | O | O | O |

| Example | 13 | 14 | 15 | 16 | 17 |
|---|---|---|---|---|---|
| half-curing time | 80 | 110 | 120 | 60 | 110 |
| complete curing time | 140 | 160 | 190 | 100 | 190 |
| water spot resistance | O | O | O | O | O |
| pencil hardness | F | HB | HB | H | HB |
| 60° specular gloss | 92 | 92 | 92 | 90 | 94 |
| transparency | O | O | O | O | O |

| Comparative Example | 4 | 5 | 6 |
|---|---|---|---|
| half-curing time | 170 | 150 | 210 |
| complete curing time | 270 | 240 | 310 |
| water spot resistance | X | O | X |
| pencil hardness | B | HB | B |
| 60° specular gloss | 83 | 87 | 94 |
| transparency | X | X | O |

What is claimed is:

1. A two component polyurethane coating consisting of a principal component (A) comprising a hydroxyl group containing film-forming resin selected from the group consisting of an acrylic resin and a polyester resin, crosslinked polymer particles and a solvent for said film-forming resin and a hardener component (B) comprising a polyisocyanate compound, which is characterized by using as the crosslinked polymer particles composite resin particles each comprising a particulate crosslinked polymer core selected from the group consisting of an acrylic resin and a polyester resin and a number of substantially linear polymer chains coupled with said core by way of chemical bonding, semi-interpenetration or a combination of chemical bonding and semi-interpenetration and containing a metal element in either portion of said core, said polymer chains or both the core and polymer chains, the solid weight ratio of said hydroxyl group containing film-forming resin to said composite resin particles being 99/1 to 40/60 and the equivalent ratio of isocyanate groups in the hardener component (B) to hydroxyl groups in the principal component (A), including the hydroxyl groups in the substantially linear polymer, if present, in addition to the hydroxyl groups in the film forming resin, being 0.5 to 2.0, wherein said substantially linear polymer is selected from the group consisting of an acrylic resin and polyester resin, and said metal element is selected from the group consisting of Zn, Sn, Al, Fe, Zr, Ti, Ge, Pb, Cr, Mg, Ca, Sr, Li, Na and K.

2. The two component polyurethane coating according to claim 1, wherein the metal element is included in at least part of the substantially linear polymer chains.

3. The two component polyurethane coating according to claim 1, wherein the metal element is included in the crosslinked polymer core.

* * * * *